(12) United States Patent
Bartok et al.

(10) Patent No.: US 11,277,270 B2
(45) Date of Patent: Mar. 15, 2022

(54) FLEXIBLE CONTROLS FOR CERTIFICATES

(71) Applicant: Venafi, Inc., Salt Lake City, UT (US)

(72) Inventors: Peter Dennis Bartok, Salt Lake City, UT (US); William Anthony Pereira, Sandy, UT (US)

(73) Assignee: Venafi, Inc., Salt Lake City, UT (US)

(*) Notice: Subject to any disclaimer, the term of this patent is extended or adjusted under 35 U.S.C. 154(b) by 268 days.

(21) Appl. No.: 16/259,603

(22) Filed: Jan. 28, 2019

(65) Prior Publication Data
US 2020/0244468 A1 Jul. 30, 2020

(51) Int. Cl.
*H04L 9/32* (2006.01)
*H04L 9/08* (2006.01)
*G06F 21/60* (2013.01)

(52) U.S. Cl.
CPC .......... *H04L 9/3263* (2013.01); *G06F 21/602* (2013.01); *H04L 9/0891* (2013.01); *G06F 2221/2101* (2013.01)

(58) Field of Classification Search
CPC . H04L 63/14; H04L 63/1416; H04L 63/1433; H04L 63/1425; H04L 63/20; H04L 90/32; H04L 9/32; H04L 9/0891; H04L 9/3263; H04L 9/0643; G07C 2009/00984; G07C 9/00309; G07C 9/00571; G07C 9/00896; G06F 16/23; G06F 21/10; G06F 21/105; G06F 21/60; G06F 21/602; G06F 21/604; G06F 2221/2101; G06Q 20/38; G06Q 30/06
See application file for complete search history.

(56) References Cited

U.S. PATENT DOCUMENTS

| | | | | |
|---|---|---|---|---|
| 10,819,700 | B1* | 10/2020 | Perlman | H04L 9/3271 |
| 2004/0250090 | A1* | 12/2004 | Crispin | G06F 9/30003 713/189 |
| 2011/0231292 | A1* | 9/2011 | McCown | G06Q 30/06 705/27.1 |
| 2015/0269570 | A1* | 9/2015 | Phan | G06Q 20/382 705/71 |
| 2017/0085532 | A1* | 3/2017 | Chan | H04L 63/0281 |

* cited by examiner

*Primary Examiner* — Baotran N To
(74) *Attorney, Agent, or Firm* — Goodwin Procter LLP

(57) ABSTRACT

Representative embodiments disclose mechanisms for flexible controls around use of cryptographic material such as encryption/decryption keys, key pairs, certificates, and so forth. The system replaces a local cryptographic agent or cryptographic service provider with a modified agent/service provider that redirects requests to utilize cryptographic key material used in a cryptographic operation to a backend system. The backend system receives the request and identifies a cryptographic process from context data associated with the request. The cryptographic process can have one or more controls attached to one or more operations in the cryptographic process. The controls are conditions that must be completed, in addition to successful completion of the underlying operation, in order to complete the underlying operation. A process owner can easily add, remove, and/or rearrange operations as well as controls to provide flexible controls around the use of cryptographic material.

20 Claims, 10 Drawing Sheets

FLEXIBLE CONTROLS FOR CERTIFICATES

FIELD

This application relates generally to obtaining and using digital certificates for cryptographic operations. More specifically, the application relates to a mechanism that provides flexible controls over obtaining and using cryptographic material for cryptographic functions.

BACKGROUND

Digital certificates are used in a wide variety of contexts to provide security to systems. For example, executable code can be signed using a digital certificate. When the executable code is later downloaded or executed, the signature on the executable code can be checked to ensure that the code has not been altered or tampered with since it was signed.

Signing code is generally accomplished using a tool, executed on a local machine, that performs the operations needed to produce the signed code, including accessing the digital certificate to produce the signature.

It is within this context that the present embodiments arise.

DETAILED DESCRIPTION

Figure 1:
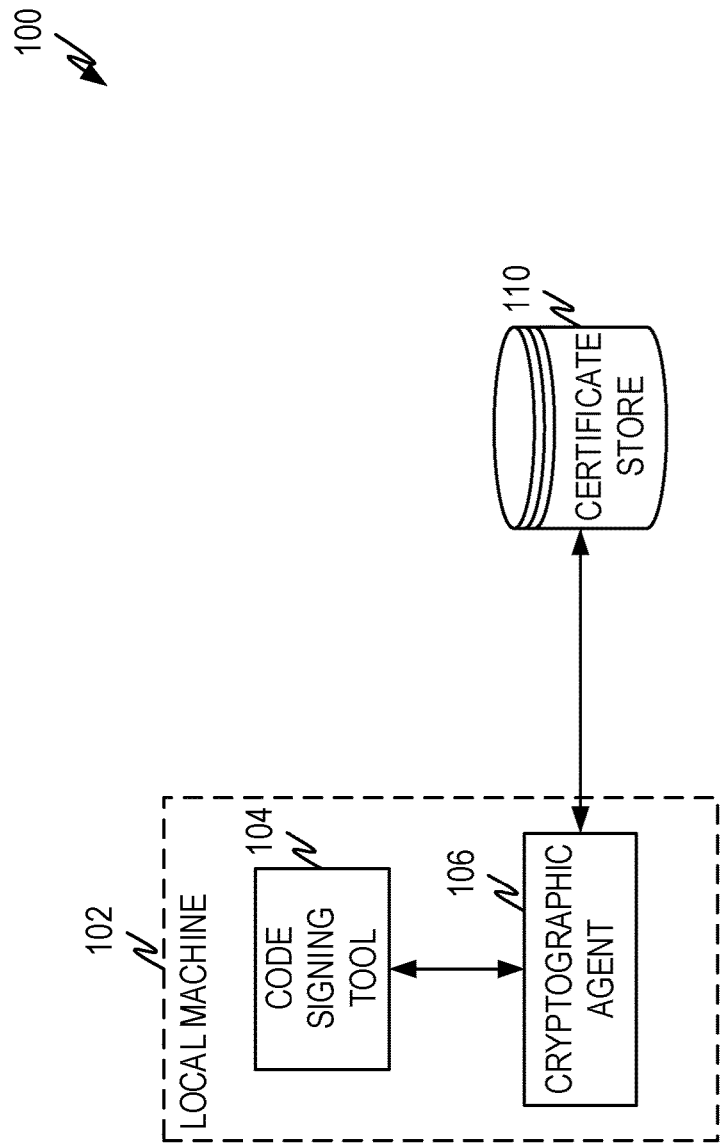
FIG. 1 illustrates a prior art architecture for code signing.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

There are many processes and procedures where cryptographic key material is used in various security contexts. In the context of this disclosure, cryptographic key material, cryptographic material, or more simply key material, means a key, key pair, key instance, certificate, and so forth that is used in cryptographic process operations or a cryptographic process. Example cryptographic process and/or cryptographic process operations include, but are not limited to, code signing where code is signed using a key or certificate do allow tampering with the code to be detected, authentication, authenticated communications, encryption, decryption, key/certificate renewal, and so forth. Some cryptographic processes are carried out according to official standardized protocols, such as, for example Transport Layer Security (TLS) protocols.

Some cryptographic processes are developed by individuals or companies for use in various contexts. For example, a company may decide to use certain processes to sign executable code prior to distribution to customers. These latter processes can vary widely between individual to individual or company to company. Furthermore, there a single individual or company can have variants of the same process used in different contexts. For example during development code may need to be signed in order to execute in the development/test environment as well as being signed before distribution to customers. Typically, the process for code signing and/or key material used for development will be different than the process and/or key material used for release to customers. Similar differences may exist for key material renewal, key material issuance, and other such cryptographic processes.

Companies and individuals may want different controls for use of cryptographic key material in these different processes. For example, for development code signing, a development certificate may be used to sign the code and few controls may be needed to ensure appropriate use of the development certificate. On the other hand, for release, a release certificate may be used to sign the release code and many controls may be desired to ensure appropriate protection and use of the release certificate. The number, type, and combination of controls used in these example processes may vary widely between companies. For example, one company may want approval at a high level for use of the release certificate, while another company may want authorization at a different level as well as more secure authentication of the individual submitting the code for signing.

In addition to the differences, both within and between companies and/or individuals, for cryptographic process, key material storage location can change. In higher security contexts, it can be desirable to store the key material in a centrally managed location and allow individuals who need access to the key material to make requests, through defined mechanisms, for access to needed key material. Continuing to use code signing as an example, the release certificate may be stored in a centrally managed location, such as a Hardware Security Module (HSM) that is connected to a secure server. Code to be signed for release is submitted in to a cryptographic process which will retrieve the appropriate certificate and create the signed code.

All these differences have been traditionally "hard coded" in that tools and processes are created so that the desired controls are built in and are part of the cryptographic processes. When changes are made to the cryptographic processes, the tools and so forth are rewritten to account for the cryptographic process changes. Furthermore, providing a service to support cryptographic processes is difficult because each cryptographic process has to be individually coded for each subscriber-cryptographic process pair, according to the needs of the subscriber. As a result, cryptographic processes tend to be standardized so that subscribers have limited choices. Additionally, since changing cryptographic processes can be expensive, the cryptographic processes are rarely changed and/or updated, even when subscribers, users, and/or service providers feel like the security could be increased.

Embodiments of the present disclosure provide mechanisms for flexible controls on cryptographic processes. Cryptographic processes are created from a series of operations that are performed as part of the cryptographic process. Cryptographic process operations include, but are not limited to, cryptographic operations (signing, encryption, decryption, signature checking, and so forth), information transfer, and so forth. Controls exist independent of the process operations and represent additional control items that have to be completed before an operation can pass to the next operation. Controls include, but are not limited to, approvals, authentication, authorization, limits and checks, and so forth. Controls are attached to operations as a condition precedent and/or condition subsequent to the operation and must be completed before the operation can complete and the process move on to the next operation.

Cryptographic process operations are created as executable process operations with executable code that performs the desired cryptographic operation. Controls are created independent from the cryptographic process operations so that they can be attached to any desired operation. A user, or subscriber (in the case where the cryptographic process operations are provided by a service provider) creates the cryptographic process by ordering cryptographic process operations and attaching desired controls. Because the cryptographic process operations and controls are reusable, they only need to be coded once and then arranged as desired. Thus variants to basic processes can be readily accommodated.

Such an arrangement allows users/subscribers to modify processes as desired and add or delete controls without changing the basic process operations, if desired. Additional operations for cryptographic processes can be added by coding the additional operations so they can be used as part of created cryptographic processes. Additional controls can be similarly added. In this way, it becomes easy to modify and update cryptographic processes to account for desired changes. Similarly, variations of the same and/or similar processes can be easily created to account for variations between users, subscribers, contexts, and so forth.

Once processes are created by arranging operations and attaching appropriate controls, then when the cryptographic process is initiated, the process is instantiated or otherwise created and executed according to the process definition.

Embodiments of the present disclosure improve the functioning of the machine by allowing for flexible controls on cryptographic processes. The flexible nature of the controls increases security of the machine by allowing cryptographic processes to be tailored to specific contexts. The reusable nature of the controls and process operations simplify the process of creating cryptographic processes, reduce the amount of executable code that must be created and stored in the system. The system also puts creation of cryptographic processes in the hands of users and/or subscribers in some embodiments further simplifying the process of creating cryptographic processes. Since process changes are easily made, processes can be tailored to specific environments so that the security of a process can be easily updated as security threats evolve, further increasing system security. Finally, process auditing can be built in at the operation or process level so that tamper resistant audit trails can be captured at the desired level of granularity.

DESCRIPTION

In the context of this disclosure, cryptographic key material, cryptographic material, or more simply key material, means a key, key pair, key instance, certificate, and so forth that is used in cryptographic operations or a cryptographic process. Example cryptographic process and/or cryptographic operations include, but are not limited to, code signing where code is signed using a key or certificate do allow tampering with the code to be detected, authentication, authenticated communications, encryption, decryption, key/certificate renewal, and so forth. Some cryptographic processes are carried out according to official standardized protocols, such as, for example Transport Layer Security (TLS) protocols.

Some cryptographic processes are developed by individuals or companies for use in various contexts. For example, a company may decide to use certain processes to sign executable code prior to distribution to customers. These latter processes can vary widely between individual to individual or company to company. Furthermore, there a single individual or company can have variants of the same process used in different contexts. For example, during development, code may need to be signed in order to execute in the development/test environment. Typically, the process for code signing and/or key material used for code signing during development will be different than the process and/or key material used for code signing prior to release to customers. Similar differences may exist for key material renewal, key material issuance, and other such cryptographic processes.

A first cryptographic process variant used as a representative example is code signing. FIG. 1 illustrates a prior art architecture 100 for code signing.

Prior to development of embodiments of the current disclosure, a developer would typically obtain a certificate to be used for code signing. A developer would likely store a copy of the certificate on a local machine 102, such as in certificate store 110. The developer would use a code signing tool 104, appropriate to the environment to sign the code. To sign the code, the developer would invoke the code signing tool 104 with the appropriate parameters, such as the code to be signed, the certificate to be used to sign the tool, and so forth.

The code signing tool 104 would create a digest or hash, such as by using a cryptographic hash function. The code signing tool would then sign the hash using the digital certificate. This could be accomplished in a couple of ways.

In some instances, the digital certificate is retrieved from its storage location 110 either directly or through a cryptographic agent (also sometimes called a cryptographic service provider) 106. The tool can then use the retrieved digital certificate to sign the digest and attach it to the executable code to create the signed code.

Sometimes cryptographic agents can perform the signing. In these instances, the sign tool can call an appropriate cryptographic agent API with the required parameters and receive the signed digest. In these instances, the certificate is often accessed locally to perform the signing.

Because the certificate is stored locally, the certificate has few, if any, access controls and there can be a variety of security problems that can arise from such a process, including subjecting the certificate to loss or attack, unauthorized use of the certificate to sign unauthorized code, and so forth.

Figure 2:
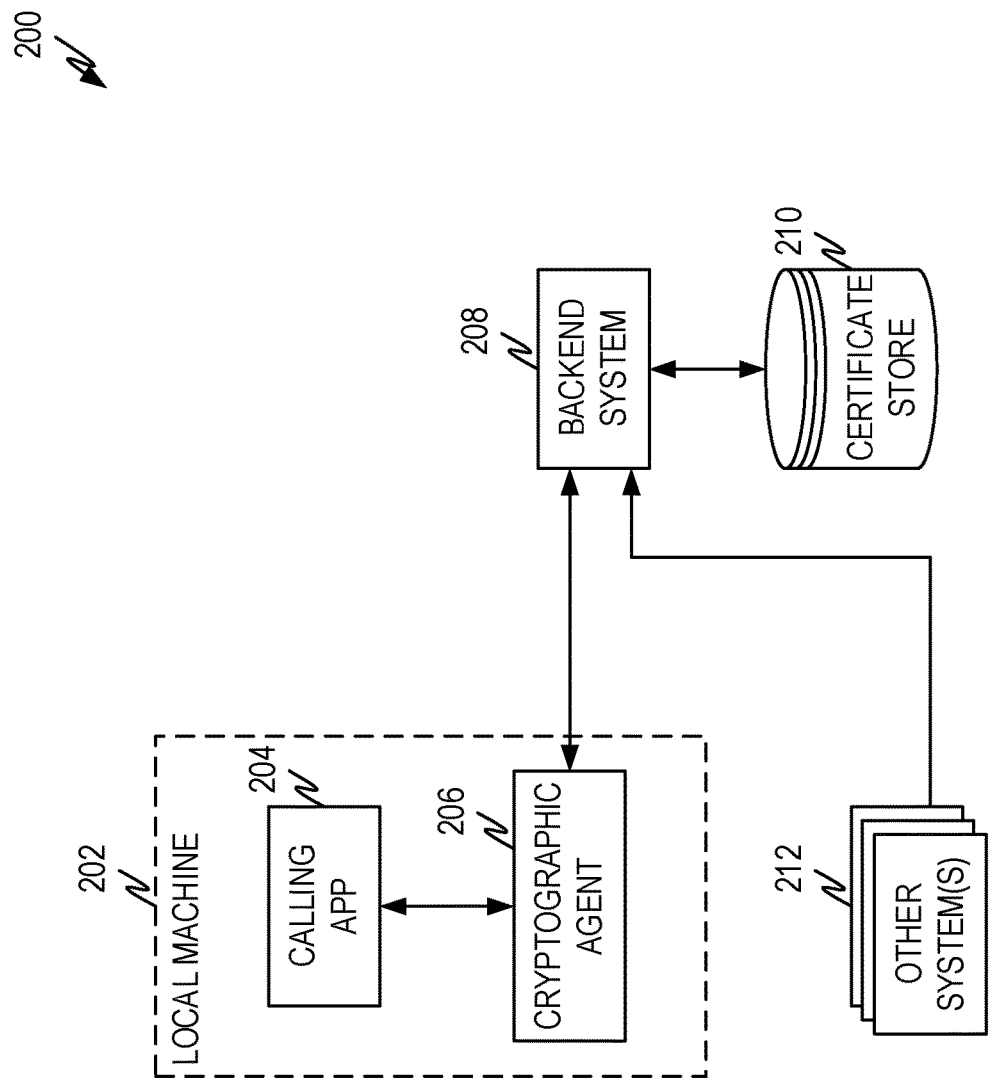
FIG. 2 illustrates an example architecture for flexible controls on cryptographic materials according to some aspects of the present disclosure.

Embodiments of the present disclosure can solve or reduce these and other security problems through the use of flexible controls on cryptographic material. FIG. 2 illustrates an example architecture 200 for flexible controls on cryptographic materials according to some aspects of the present disclosure. The flexible controls are implemented via cryptographic processes that are executed on a backend system 208. Such cryptographic processes can perform desired cryptographic process operations such as code signing, certificate/key renewal, and so forth as discussed herein.

A local machine 202 contains a calling application 204 that is used to invoke the cryptographic process. The prior art cryptographic agent is replaced by a cryptographic agent 206 adapted to communicate with a backend system 208 which will execute the cryptographic process. The backend system 208 can utilize other services and/or systems 212 as appropriate to complete the cryptographic process. Furthermore, cryptographic key material is stored in a certificate store 210 that is not directly accessible to the user and the local machine 202. In some embodiments the certificate store 210 can be a Hardware Security Module (HSM).

Using code signing as a representative cryptographic process, the user would invoke the calling application 204 using the appropriate parameters such as the code to be signed, identification of the certificate to be used for signing, and so forth. In a code signing example, the calling application 204 can comprise a code signing tool that is similar to, or the same as, the code signing tool above. This provides a benefit that a user's workflow can be the same as, or very similar to, the prior art workflow, eliminating the need to learn whole new procedures to use embodiments of the present disclosure.

The calling application 204 calls the cryptographic agent 206 to produce the signed digest. The cryptographic agent communicates with the backend system 208, which invokes the appropriate cryptographic process to produce the signed cryptographic digest.

The cryptographic process will have operations, which together represent the desired operations to produce the desired result. For example, in a code signing example, if the calling application 204 produces the digest and identifies the certificate that should be used to sign the digest, a simple code signing process may include the cryptographic process operations of:
  (1) Receive the digest and other parameters (such as identification of the certificate to be used to sign the code).
  (2) Retrieve the identified certificate.
  (3) Sign the digest using the retrieved certificate.
  (4) Return the signed digest.

If the responsibility for producing the digest is at the server, instead of being produced by the calling application 204, then the operations may also include the operation of producing the digest using an appropriate cryptographic hash function.

As it sits, the process operations above have no controls. Embodiments of the present disclosure allow controls to be attached to operations of a cryptographic process. For example, if the code signing process is for development and testing of code in a development environment, an authentication control can be attached to the "retrieve the identified certificate" operation. An authentication control can take several forms. For example, one format of authentication is to cause a prompt to be displayed to a user so that the user can enter credentials. Another format of authentication may rely on some form of multi-factor authentication. Other formats can also be used. Thus, controls are not necessarily of one type and cryptographic process owners can select from different forms of the same type of control in some embodiments.

When a control is attached to an operation, the control can be a condition precedent or condition subsequent. Some operations can have some controls attached as a condition precedent and some attached as a condition subsequent. Thus, whether controls are a condition precedent, a condition subsequent, or both can depend on the embodiment, the control, how the user attaches the control to the operation, or any combination thereof.

As a representative example of controls, suppose that the cryptographic process is code signing containing the operations described above. In this example, two controls will be used. The first is an authentication control attached to the operation that retrieves the identified certificate. This authentication control asks the user to supply authentication credentials prior to accessing the specified certificate. The second control is a geographic control attached to the final operation (return the signed digest) that checks to ensure that geographic location of where the signed digest is to be returned to is an authorized geographic location for the credentials supplied in response to the authentication control of the first operation. Thus, while both of the conditions are condition precedent and must be satisfied before the corresponding operation is performed, the second condition relies, in part, on information gathered in the first condition.

Some operations and/or controls can utilize other services and/or systems 212 to complete the required operation/control. As an example, suppose code is being signed prior to release using a release certificate. Release certificates may be very tightly controlled due to the cost (reputation, monetary, and so forth) of having the certificate misused. For example, if a bad actor can get malware signed by a valid release certificate, the damage can be significant. The trusted release certificate may get the malware installed on systems that normally would be unavailable to it. The company whose release certificate was misused may be subject to significant monetary and reputation damage and liability. The process to fix such misuse may be complex and also have significant monetary, time, and reputation costs associated with it. Thus, because the risks associated with misuse are significant, code signing in a code release context may have significant controls associated with use of the release certificate to sign the code to be released.

As an example, perhaps the "retrieve the identified certificate" operation may have multiple authorization and/or authentication controls attached. For example, perhaps the developer is not authorized to access the certificate. In order to get the code signed, the developer's manager must first provide authorization. Next the release manager must provide their authorization. Finally, the vice president must enter authentication information before the certificate can be accessed.

In some instances where multiple controls are attached to an operation, the controls are implemented as a chain of controls that occur in an ordered sequence. In other instances, controls may be unordered and the only thing that matters is that all control conditions are met. In still other instances a combination can be used with a set of unordered controls completed before or after a set of ordered controls. Thus, controls can be ordered, unordered or a combination of ordered and unordered. Execution of unordered controls can be done in parallel or in any order. Unordered controls simply means that the order of execution does not matter and they can be instantiated and executed in any order, or in parallel.

Carrying on with the prior example, the "sign the digest using the retrieved certificate" operation may have a use limit control that is set either a-priori in the control or set by another control. For example, the release manager approval in the "retrieve the identified certificate" operation may include a number, which indicates how many packages of code make up the release and that are to be individually signed. A use limit control on the "sign the digest using the retrieved certificate" operation may then take the number and utilize the certificate the specified number of times to sign code. If the cryptographic process attempts to sign more than the specified number of times, the process can fail with appropriate notifications and/or audit trails as discussed herein. In this example, the use limitation acts can as a condition subsequent or condition precedent or both, depending on the embodiment. In one embodiment, the use limitation is checked after and/or during the operation and is a condition subsequent. In another embodiment, the use limitation is implemented as a condition precedent so that the number of packages to be signed is checked prior to any signing taking place and the condition is not met if the number of packages would call for use beyond the specified number of times.

To implement controls and or operations, the backend system can utilize other services and/or systems 212. For example, to gain authorization for an authorization control, the backend system 208 may cause a notification and/or authorization request to be sent to one or more other systems where the person giving authorization may be found.

Figure 3:
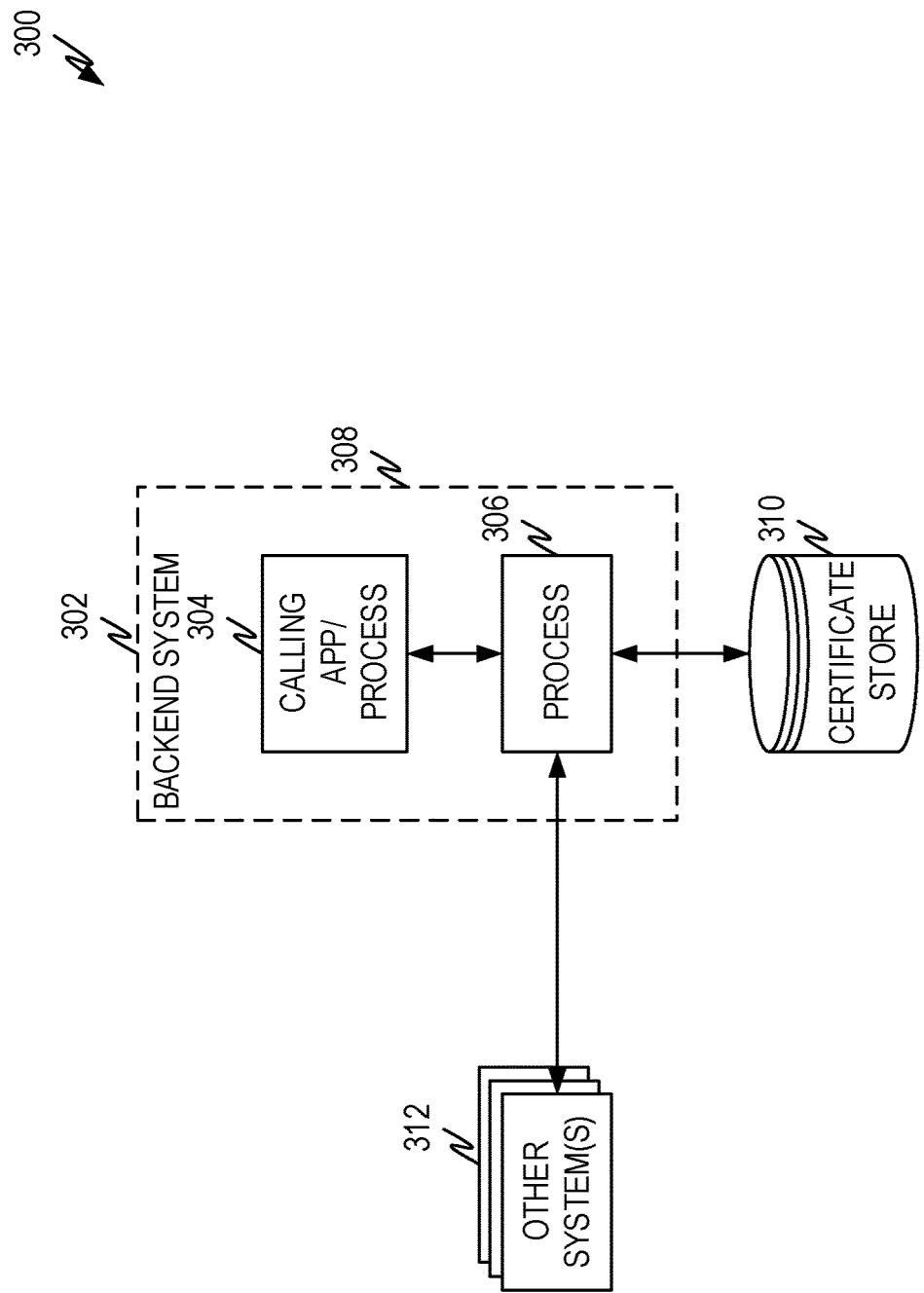
FIG. 3 illustrates an example architecture for flexible controls on cryptographic materials according to some aspects of the present disclosure.

FIG. 3 illustrates an example architecture 300 for flexible controls on cryptographic materials according to some aspects of the present disclosure. In this architecture, the calling application and/or process is located on the backend server or another server system. This can represent a process that is initiated based on some sort of criteria rather than being initiated by a user. For example, cryptographic material may expire on a periodic basis and either be renewed or new cryptographic material be issued.

As a representative example, obtaining a new certificate to replace an expiring certificate may have the following basic operations.

(1) Generate a key pair.
(2) Obtain other information needed to generate a certificate signing request (CSR).
(3) Create the CSR.
(4) Send the CSR to a certificate authority (CA).
(5) Receive the signed certificate.
(6) Save the certificate in a certificate store.
(7) Deploy the certificate to appropriate machines.

The cryptographic process owner can attach various controls to the different operations. For example, there can be a verification control attached to the "create CSR" operation that verifies that the key pair and other information meets designated requirements such as proper key length, the other information is correct for the certificate, and so forth. One or more authorization controls can be attached to the "send CSR to the CA" operation so that before the cost with having a CA sign a certificate is incurred, approval is given. Other controls can be used in any combination, as desired.

As a representative example of how the architecture 300 would work in such a circumstance, a cryptographic material manager or other process 304 that operates on the backend system 308 or another system can identify that a new certificate is needed due to some event, such as a certificate rotation event. The cryptographic process 306 is identified and instantiated as described herein. The cryptographic process 306 operates according to the process operations and attached controls as specified in the cryptographic process definition. This can involve communicating with other systems and/or services 312 to accomplish the process operations and/or controls. For example, authorization controls, generating key pairs, sending a CSR to a CA, and deploying the certificate to desired machines can all utilize other systems and/or services 312.

Figure 4:
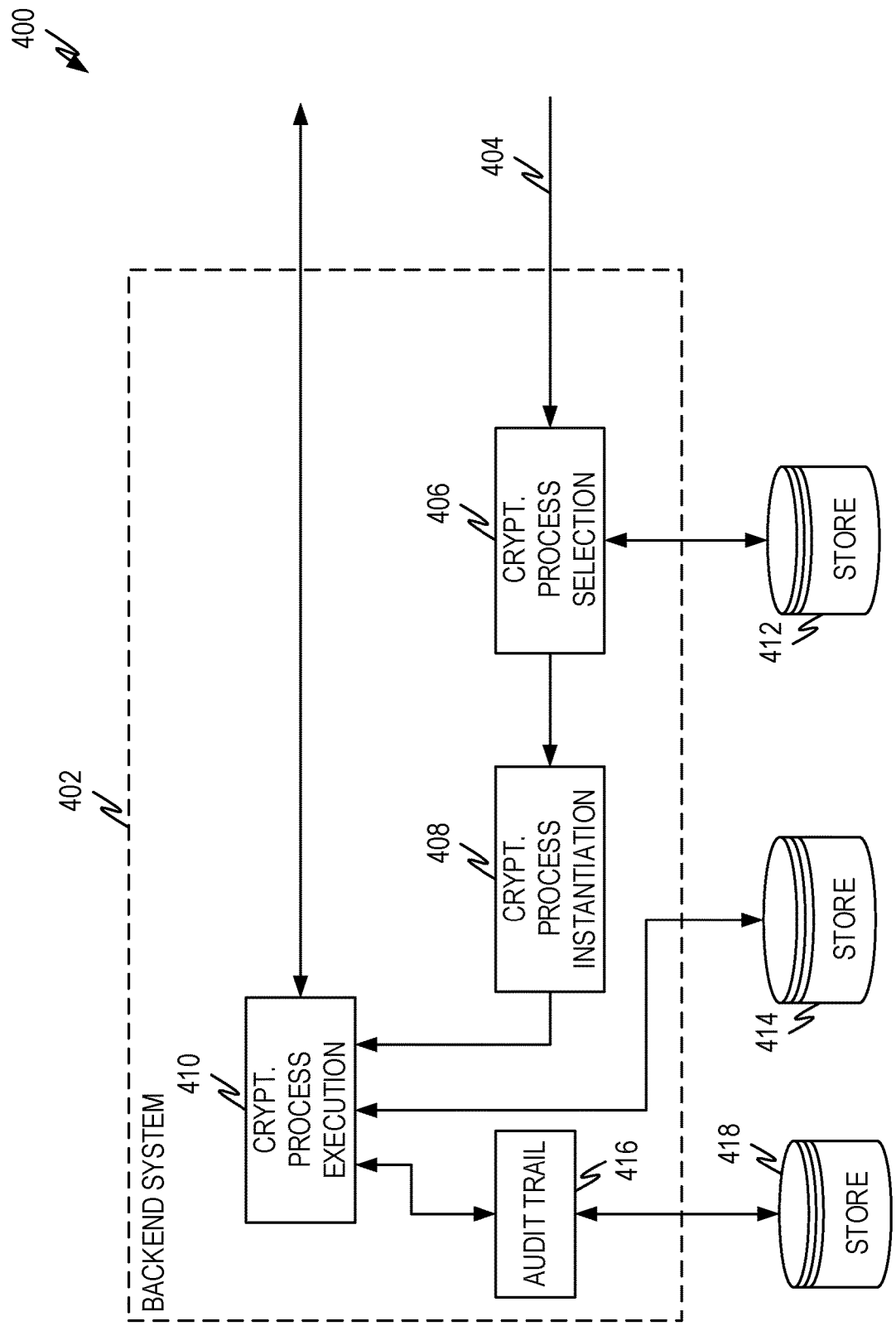
FIG. 4 illustrates a representative backend system for flexible controls on cryptographic materials according to some aspects of the present disclosure.

FIG. 4 illustrates a representative backend system 402 for flexible controls on cryptographic materials according to some aspects of the present disclosure. The backend system 402 can be the backend system 208 and/or backend system 308, for example.

The backend system 402 comprises a cryptographic process selector 406, a cryptographic process instantiation engine 408, an execution environment for executing the cryptographic process 410, and an audit trail generator 416. Additionally, one or more data stores in the form of HSM or other types of databases or data stores can be used to store various information as specified herein.

A request or other event 404 is received to initiate a cryptographic process. The request 404 has information that allows the backend system 402 to identify which cryptographic process should be invoked and information that the invoked process needs to execute. For example, a request can comprise contextual information such as the identity of the calling process or application, user information if a user initiated the request, the identity of the system where the request originated, the parameters associated with the call, system and/or geographic location from which the process was invoked, and so forth. From these, the cryptographic process selector 406 identifies and selects which cryptographic process should be executed. For example, if the request comes from a code signing tool that was invoked by a particular user from a particular system, the cryptographic process selector can identify that the cryptographic process is a code signing process and that the particular variant of the code signing process is one that the user is authorized to invoke from the system. If the system is unable to determine which cryptographic process should be invoked, the system can cause a query to be sent to the user to select the correct process, disambiguate from among possible choices, and/or so forth.

Thus, the cryptographic process selector 406 can access a set of rules or policies that map received information to cryptographic processes in order to identify which cryptographic process the user and/or process intended to invoke.

Once the process has been identified, information that defines the identified process such as a process definition can be retrieved, e.g., from a store such as store 412. The process definition describes the cryptographic process operations that make up the process along with attached controls. The process definition can comprise identifiers for cryptographic process operations and/or controls along with other information that will allow the cryptographic process to be instantiated and executed.

The exact format of the process definition can take on several forms, depending on the embodiment. However, the ordered sequence of the process operations as well as the controls attached to a process operation will be included. For example, using certificate rollover as an example, a new certificate is obtained to replace an expiring or otherwise invalid certificate and the new certificate is deployed or provisioned on appropriate machines. Suppose the cryptographic process was created with the following sequence of operations:

(1) Generate a key pair.
(2) Create a CSR.
(3) Send the CSR to a certificate authority (CA).
(4) Receive the signed certificate.
(5) Deploy the certificate to appropriate machines.

Additionally, suppose the following controls are attached to the following operations:

(1) Generate a key pair: C1-authorization (SysAdmin).
(2) Create a CSR.
(3) Send the CSR to a certificate authority (CA): C1-authorization (SysAdminManager)
(4) Receive the signed certificate.
(5) Deploy the certificate to appropriate machines: C1-authentication (SysAdmin); C2-geographicCheck (destination; targetMachine).

Where the authorization (x) is authorization by the designated role and authentication (x) is authentication of the designated role. The geographicCheck (x,y) controls checks where the process is sending the certificate (e.g., the geographic destination specified by x of the certificate) against the known geographic location of the supposed recipient machine (e.g., the target machine, specified by y). The authentication and geographicCheck controls of operation (5) are an ordered sequence as specified by the C1, C2 designation.

In this instance the process definition would specify the ordered sequence of the cryptographic process operations (i.e., 1-5) and the controls, as well as their ordered sequence, when applicable.

Cryptographic process instantiation engine 408 takes the process definition and performs any operations necessary to instantiate the process so it can execute. The exact nature of these operations will depend on how process execution is accomplished. For example, in one instance, the process instantiation engine 408 can create an executable process from the process definition ready to execute in an execution environment. As an example, each process operation and control is defined by executable code, which can be script code, intermediate code, object code, and so forth. Instantiating the process can involve merging the code of the individual operations and controls into an executable format that can be executed in the execution environment of the system. As another example, the process instantiation engine can create a description similar to a syntax tree that shows what operations are performed when and that can be consumed by an execution engine to actually execute the process.

The format of what is produced by the cryptographic process instantiation engine 408 depends on what is needed by the execution environment where the cryptographic process executes. For any given execution environment, what is needed will be known and can be similarly produced by the cryptographic instantiation engine 408.

Once the cryptographic process has been instantiated, the cryptographic process is executed in the execution environment as indicated by cryptographic process execution 410. As specified in the cryptographic process, cryptographic material can be accessed such as from store 414. In addition, the system can capture information to create an audit trail as described herein and saved in a data store such as store 418.

Figure 5:
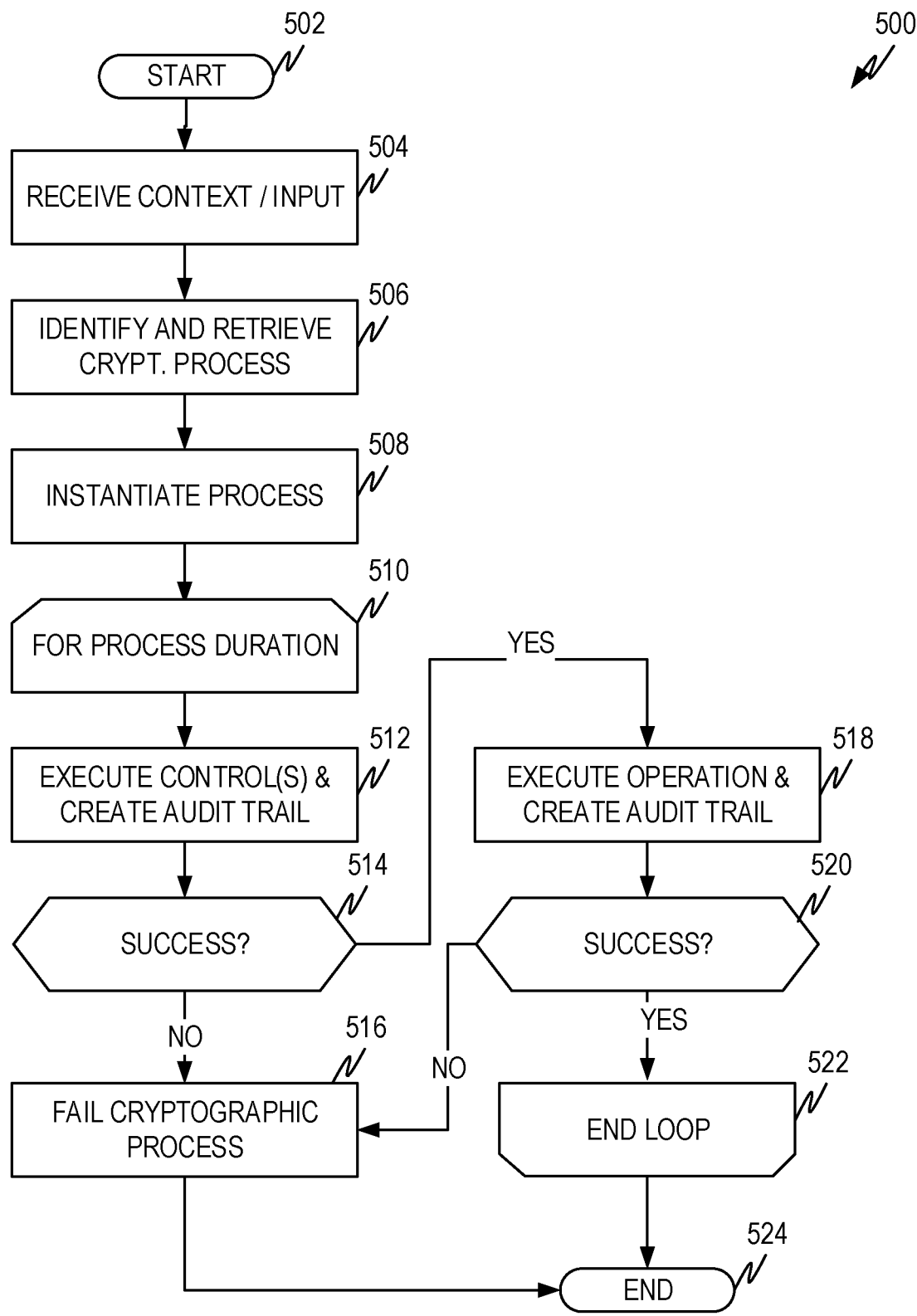
FIG. 5 illustrates a representative flow diagram for flexible controls on cryptographic materials according to some aspects of the present disclosure.

FIG. 5 illustrates a representative flow diagram 500 for flexible controls on cryptographic materials according to some aspects of the present disclosure. The method starts at operation 502 and proceeds to operation 504 where input and/or context information is received. In the context of this discussion, no distinction is made between input information and context information and all will be referred to as context information. As noted above, context information can comprise information such as the identity of the calling process or application, user information if a user initiated the request, the identity of the system where the request originated, the parameters associated with the call, information received from the user, system and/or geographic location from which the process was invoked, and so forth.

From the context information, the cryptographic process to be invoked is identified and the process definition is retrieved at operation 506. As previously noted, this can be accomplished by using rules or policies to map a subset (i.e., all or less than all) of the context information to the corresponding cryptographic process description.

Once the process description is obtained, operation 508 instantiates the cryptographic process as previously described. The process is then executed in the corresponding execution environment. Thus, operation 510 begins a loop that continues until all cryptographic process operations have been successfully completed as indicated by the end loop operation 522 or until an error is encountered as indicated by operation 516.

In the execution loop, the controls attached to the current cryptographic process operation are executed as indicated in operation 512. As noted elsewhere, controls can be any condition that needs to be completed prior to, or subsequent to, execution of the cryptographic operation. For simplicity, operation 512 shows the controls executed prior to execution of the current cryptographic operation (i.e., in operation 518). However, if controls are to be executed subsequent to execution of the current cryptographic operation, they would be executed as another block after the successful completion of the current cryptographic operation (e.g., after success test 520).

In operation 512, the controls are executed as an ordered sequence, unordered sequence, or combination thereof as described herein and as specified by the process description. Examples of particular controls are discussed in conjunction with FIG. 8 below and in examples discussed herein.

Additionally, an audit trail record can be created for control execution and/or completion at any desired level of granularity. For example, if it is desired to capture audit trail information at a fine granularity, when a control executes, information including a subset (e.g., all or less than all) of the context parameters, an identifier of the control, the results of the execution, a time stamp, and/or other information can be captured in an audit trail record. The audit trail record can be cryptographically signed with appropriate cryptographic material to reduce or detect tampering with the record. The audit trail record (signed and/or unsigned) can be stored in an appropriate data store for later retrieval and/or analysis as discussed herein. When a less fine granularity is desired, the audit trail record can be captured at different times, such as at the end of the execution of all attached controls, and so forth.

Operation 514 tests whether the controls ended in successful completion. If not, the cryptographic process can fail with appropriate audit trail records created and/or notifications.

Upon successful completion of the corresponding controls, operation 518 executes the current cryptographic process operation and captures an audit trail record if desired. Operation 520 tests for successful completion of the current cryptographic process operation and returns for the next cryptographic process operation, if any (operation 522) or fails as previously described (operation 516).

The method ends at operation 524.

Figure 6:
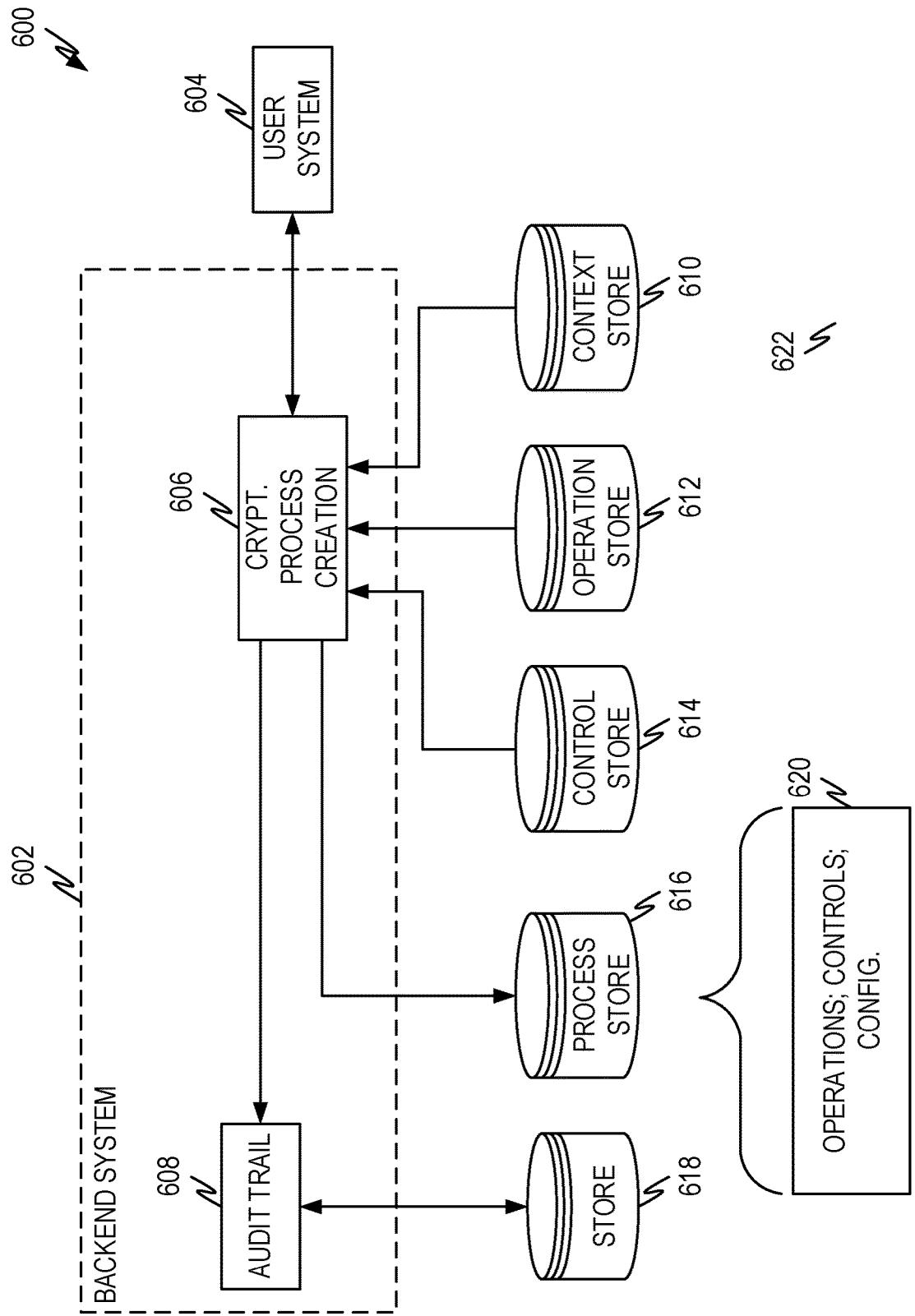
FIG. 6 illustrates a representative architecture for creating a cryptographic process with flexible controls according to some aspects of the present disclosure.

FIG. 6 illustrates a representative architecture 600 for creating a cryptographic process with flexible controls according to some aspects of the present disclosure. This embodiment allows for a process owner to create a cryptographic process. For example, if the backend system 602 was provided by a service provider, the process owner can be a subscriber to one or more offered services. If the backend system 602 was provided by a company, the process owner can be one or more individuals in the company. In still another example, a process owner may create a process description as described herein on a local or company owned system and the pass the process description to a service provider for storage and/or execution. The architecture lends itself to being applied in a wide variety of contexts.

In one example context, a process owner uses a system or device 604 to connect to a system 602 where the process creation can occur. The system comprise a cryptographic process creation mechanism 606 which causes presentation of user interfaces and other tools that allow a process owner to create cryptographic processes. A representative method for creating cryptographic processes is discussed below in conjunction with FIGS. 7 and 8.

To create a cryptographic process, a process owner will access cryptographic process operations, such as might be stored in a cryptographic process operation store 612, controls, such as might be stored in a control store 614, and context and/or configuration information, such as might be stored in a context and/or configuration store 610. The cryptographic process operations, controls, and/or context/configuration information are assembled as described herein to produce a process description 620 that contains the corresponding operations, controls, and context/configuration information. The process description can be stored in a data store, such as process store 616 so that the descriptions can be accessed when the process is executed as described herein.

Additionally, an audit trail record can be created as indicated in 608 and stored in an audit trail record store 618. The audit trail record can comprise information such as what cryptographic process was created and/or edited, identity of the user that created and/or edited the cryptographic process, cryptographic process operations for the cryptographic process, controls for the cryptographic process operations, configuration and/or context information, and so forth. The record can be time stamped and signed to help prevent, reduce, and/or detect tampering.

Figure 7:
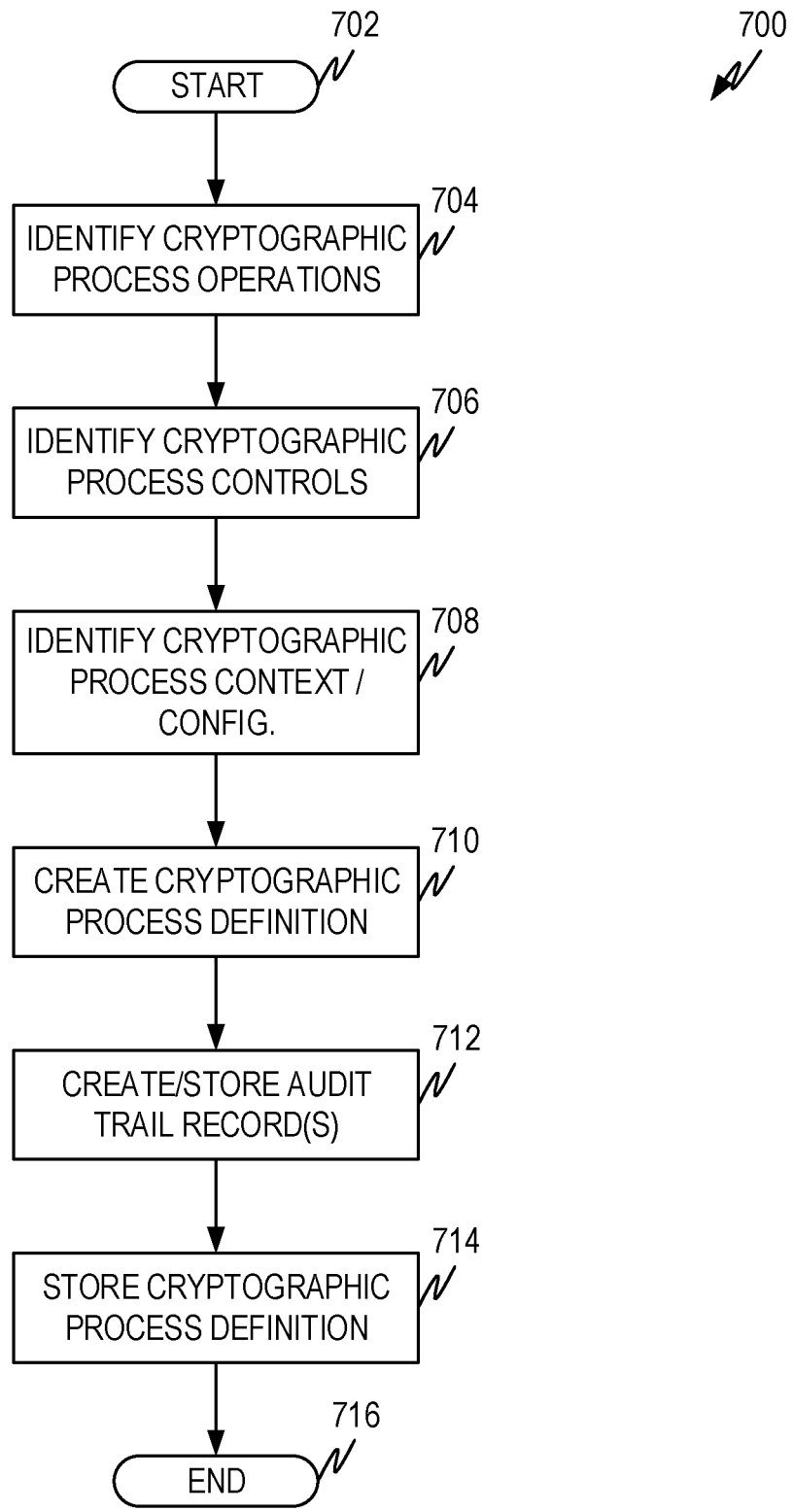
FIG. 7 illustrates a representative flow diagram for creating a cryptographic process with flexible controls according to some aspects of the present disclosure.

FIG. 7 illustrates a representative flow diagram 700 for creating a cryptographic process with flexible controls according to some aspects of the present disclosure. The process begins at operation 702 and proceeds to operation 702 where the system causes presentation of a user interface to the user that allows a user to identify which cryptographic process operations will be part of the cryptographic process and the ordered sequence of the cryptographic process operations, if any. As discussed in conjunction with FIG. 8, such a user interface can allow a user to drag and drop desired cryptographic process operations to identify which operations should be part of the cryptographic process and the ordered sequence, if any, of the operations.

Additionally, or alternatively, the system can present predefined templates of cryptographic processes that a user can either adopt, or start with and modify. Such templates can be created by others (other users, service provider, and so forth) in order to help users so they do not always have to start with an empty cryptographic process.

In Operation 706, users identify one or more controls that they want to attach to one or more cryptographic process operations. This can be done via a user interface that allows a user to drag and drop controls, order controls, and so forth.

In operation 708, users identify context information and/or configuration information for the process. This includes but is not limited to: 1) identifying any inputs needed for cryptographic process operations and/or controls; and 2) identifying when the process should be invoked (e.g., defining the rule and/or policy that maps context to the process definition).

As noted herein, controls and/or cryptographic process operations can utilize input parameters. For example, a cryptographic signing operation will need the identity of the cryptographic material to be used in the signing, an authorization control will need the identity and/or role of the entity that should provide the authorization, and so forth. Thus, when a user identifies cryptographic process operations and/or controls, the user may need to identify certain input parameters for the controls/operations.

As discussed herein, rules and/or policies can be used to map received context parameters to cryptographic processes. The tool and/or process allows the user to identify the conditions under which the created cryptographic process should be invoked. Stated another way, the user can provide the information from which the rule/policy can be created and/or guide the user through creating the rule/policy.

Once the cryptographic process operations, controls, and context/configuration information has been collected, the system can create the cryptographic process definition and/or the rule/policy to invoke the cryptographic process in operation 710.

Operation 712 creates one or more audit records of the appropriate level of granularity. The audit records can be time stamped and/or signed as discussed herein.

Operation 714 stores the cryptographic process definition and/or rule/policy in the appropriate stores and the method ends at operation 716.

Although not specifically shown in FIG. 7, the process can provide error checking prior to or after creating the process definition. For example, once a user has assembled the process, its controls, and the rule/policy for invocation, the system can ensure that there are no errors in the process, such as by making sure that each process operation and/or control has the information that it needs to execute and that the information flows appropriately between operations and/or controls, by making sure the process can be appropriately invoked (e.g., that there is not a logic error that would preclude the process from being invoked, and so forth.

Figure 8:
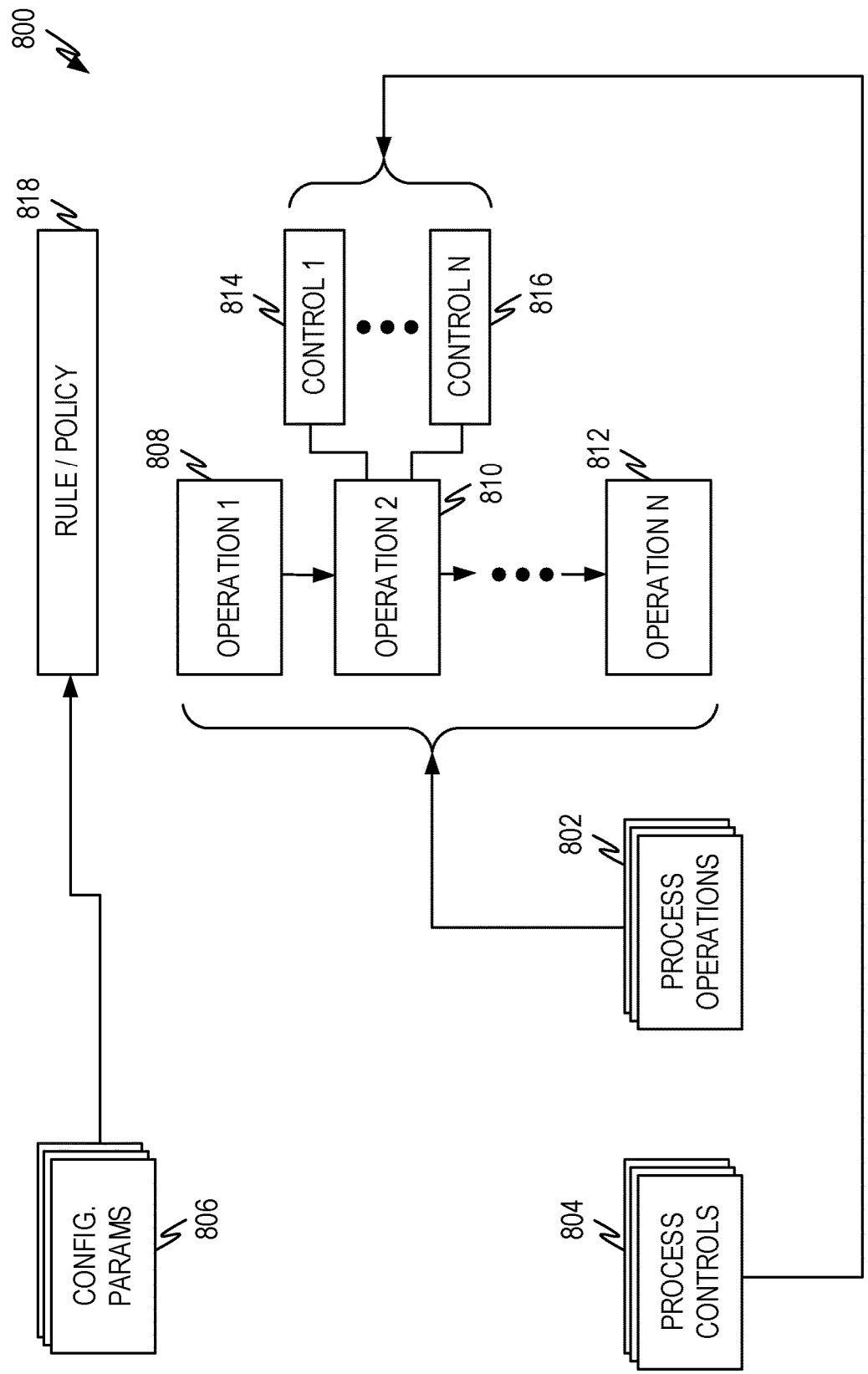
FIG. 8 illustrates a representative cryptographic process with flexible controls according to some aspects of the present disclosure.

FIG. 8 illustrates a representative cryptographic process 800 with flexible controls according to some aspects of the present disclosure. As noted herein, cryptographic process operations 802 and process controls 804 comprise executable instructions that carry out the operation or the control. Thus, the cryptographic process operations 802 and process controls 804 can be thought of as executable units that receive any inputs needed to accomplish their function and produce any resulting outputs. The executable instructions can be in any format that is compatible with the execution environment where the instructions of an instantiated cryptographic process is executed or that can produce such instructions.

Cryptographic process operations 802 can comprise any combination of cryptographic operations and other process operations. Cryptographic operations are operations that utilize cryptographic material and/or a cryptographic function. Thus, cryptographic operations include, but are not limited to, such operations as signing, encryption, decryption, time stamping (such as specified in RFC 3161), signature checking, and so forth. Other process operations include, but are not limited to, information transfer, information storage, information retrieval, interacting with other systems and/or processes to initiate various actions, and so forth.

Controls exist independent of the process operations and represent additional control items that have to be completed before an operation can pass to the next operation. Controls include, but are not limited to:

Approvals (also called authorization), which is obtaining approval/authorization from a designated individual, role (certificate owner, process owner, etc.), group, and so forth.

Authentication, which is checking the identity of an individual, role, group, and so forth such as through username/password, multifactor authentication, and so forth.

Limits, which are specific limits on something. For example, a limit on the number of times cryptographic material can be used to perform a particular cryptographic process operation, a limit on the number of times that a particular user can invoke a particular process, and so forth. Limits can also define controls such as geographic limits (something must be within or outside of a geographic location or area before the control succeeds), quorum (n of m things must happen before the control succeeds), time (time of day, day of week, day of year, and so forth) when something must occur or must not occur in order for the control to succeed, and so forth.

Checks, which are specific checks performed on something. Checks include such things as testing for membership, checking other conditions, testing for exclusion, and so forth.

Other conditions.

Combinations are also possible, either by combining controls, or by ordering controls in a particular way. Additionally, or alternatively, information that is collected by or in a prior control can be used in a later control. For example, if an authentication control is used and a user provides authentication information, the authentication information can be later used in a limit control. As a specific example, if a user provides a user name as part of an authentication control attached to one process operation, a limit control attached to a different operation and which checks to see whether a user is on a list of authorized users, can use the user name previously provided.

Thus, the execution environment can provide for mechanisms so that information can be passed between cryptographic process operations and their attached controls and other cryptographic process operations and their attached controls.

As previously discussed, placing creation and/or modification of the cryptographic process in the hands of a process owner allows cryptographic processes to be easily tailored as desired by the process owner. Through user interfaces and/or other mechanisms, the process owner either takes a template, which defines a particular cryptographic process, and/or an existing cryptographic process, and/or starting with an empty process, organizes cryptographic process operations 802 in an ordered sequence, such as 808, 810, and/or 812. The ordered sequence of operations can also include operations that can be completed in parallel, or in any order, as well as operations to be completed in a particular order. For example, for certificate renewal, a key pair is obtained prior to a CSR being created, but it may not matter which order the new certificate is deployed onto relevant machines, or whether the new certificate is stored in a centralized data store prior to, or after deployment.

The resulting cryptographic process can be executed to achieve the desired result, but no controls have yet been added. The process owner can thus attach one or more controls to one or more cryptographic process operations. The controls can represent an ordered sequence, an unordered sequence, or any combination thereof. The controls represent additional conditions that must be successfully completed before execution can move from the current process operation to the subsequent process operation. Stated another way, the controls represent conditions that are required to declare successful completion of the current operation so that both successful completion of the process operation and successful completion of the conditions are required to declare successful completion of the process operation. Thus, in the FIG., controls 814 and 816 are attached to operation 810.

The process operations and attached controls thus allow the cryptographic process to execute with the desired controls in place. However, the system still needs to know when to invoke the process. As described herein, cryptographic processes are invoked when a rule/policy is met. Thus, a process owner can be presented with a series of configuration parameters 806 that allow the user to produce a rule and/or policy 818 that determines when the cryptographic process is invoked.

As an example, a process that signs code for a developer as part of a development and testing process may be invoked when a designated combination of the following are detected in the context parameters (described above):

The calling application is a code signing tool;

The user invoking the code signing tool is a member of a designated group or has a designated role; and The requested certificate is one of a set of development certificate.

As another example, a process that signs code for release may be invoked when a designated combination of the following are detected in the context parameters:

The calling application is a code signing tool;

The user invoking the code signing tool is a member of a designated group or has a designated role;

The machine on which the code signing tool resides is located in a particular geographic region;

The time at which the code signing tool is invoked falls within a designated set of times; and The requested certificate is a release certificate.

From the above two examples, it is apparent that when a process owner creates a cryptographic process, they can identify any combination of context parameters that must and/or must not occur. Additionally, or alternatively, context parameters can be listed as optional or occurring in the alternative. Thus, any Boolean logic combination of context parameters can be used to define the rule/policy that causes invocation of the corresponding cryptographic process.

Once a user has assembled the process, its controls, and the rule/policy for invocation, the system can ensure that there are no errors in the process, such as by making sure that each process operation and/or control has the information that it needs to execute and that the information flows appropriately between operations and/or controls, by making sure the process can be appropriately invoked (e.g., that there is not a logic error that would preclude the process from being invoked, and so forth.

As discussed herein, audit trail records can be created at the desired level of granularity for cryptographic process operations, controls, or both. These records can comprise information that relate to the process operation and/or control such as the identity of the process operation and/or control, some or all of the context information related to the process operation and/or control, time stamp information (such as specified in RFC 3161), and/or other information. When these audit trail records are created, some or all of the information in an audit trail record, or in a set of audit trail records can be protected to prevent, reduce, or enable detection of tampering. For example, individual audit trail records can be protected, the audit trail records for an entire cryptographic process with its accompanying controls can be protected as a unit, or any level between these two. The aspects for the desired set of audit trail records to be protected can be used to create a digest through a cryptographic hash function and the digest can be signed using cryptographic material. The digest can be checked using known methods to detect whether the protected information has been altered.

Figure 9:
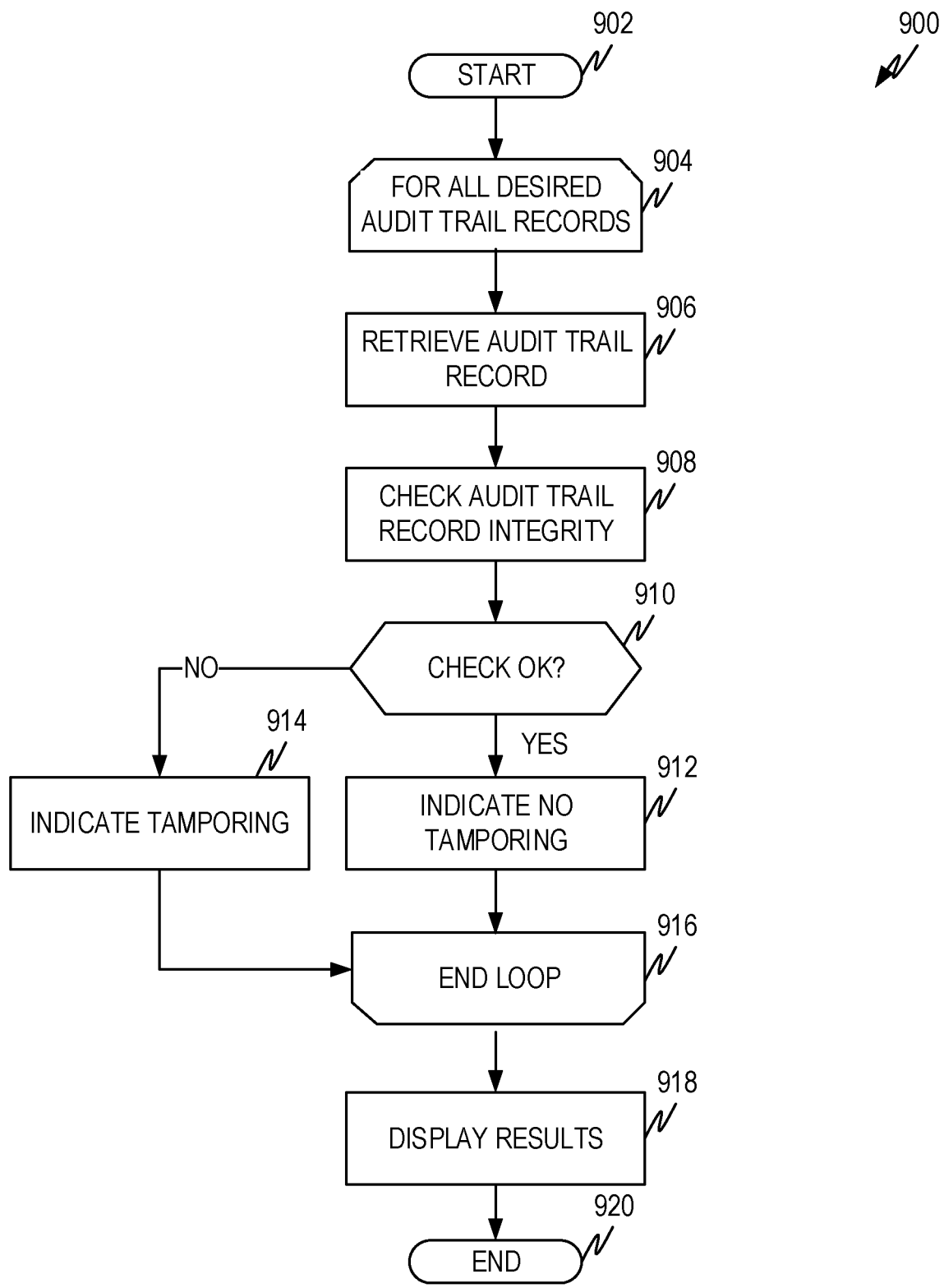
FIG. 9 illustrates a representative flow diagram for an audit trail for a cryptographic process with flexible controls according to some aspects of the present disclosure.

FIG. 9 illustrates a representative flow diagram 900 for an audit trail for a cryptographic process with flexible controls according to some aspects of the present disclosure. The process retrieves desired audit trail records, checks for alterations, and displays the results.

The process begins at operation 902 and proceeds to operation 904 which begins a loop that closes at operation 912. In operation 906 audit trail records are retrieved in the chunk at which they were protected. For example, if audit trail records are individually protected, the next individual audit trail record is retrieved. If, however, the audit trail records for an entire cryptographic process with its associated controls are protected as a unit, then the audit trail records for the entire cryptographic process with its associated controls are retrieved.

Operation 908 checks the integrity of the retrieved audit trail record(s). This is typically done by recreating the digest using the same process originally used to create the digest before signing and the comparing the recreated digest to the decrypted digest that was used to sign the record(s). If the digests match, no alterations have been detected. Otherwise, the integrity of the record(s) has not been established.

Operation 910 tests whether the integrity was established or not established. If the integrity was not established, the system can indicate that the audit trail record(s) have been tampered with in some fashion (operation 914). Otherwise, no tampering was detected (operation 916).

Operation 916 ends the loop started by operation 904. The loop continues until all the desired records have been retrieved and checked. This can be for a set of records, a set of processes, and so forth. Once all desired records have been retrieved and checked, the results are displayed at operation 918. Such results can be detailed, showing the sequence of records with the associated data and integrity check status, can be in summary form such as a single indication of the integrity check status, or any combination of information. Furthermore, the information can be displayed in a non-interactive format such as a fixed report or in an interactive format such as a data set that can be manipulated by a user.

The process ends at operation 920.

Example Machine Architecture and Machine-Readable Medium

Figure 10:
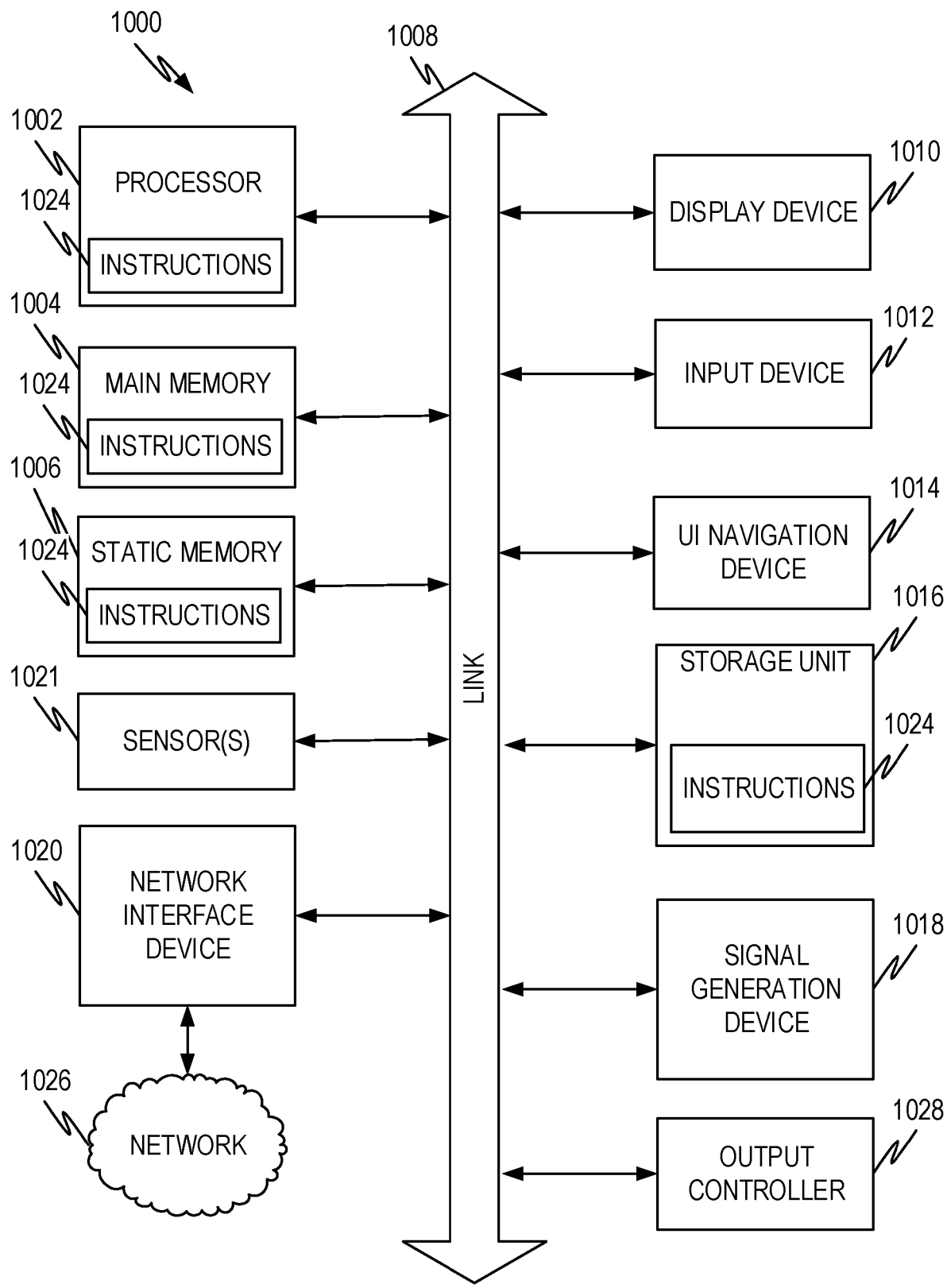
FIG. 10 illustrates a representative machine architecture suitable for implementing the systems and other aspects disclosed herein or for executing the methods disclosed herein.

FIG. 10 illustrates a representative machine architecture suitable for implementing the systems and other aspects disclosed herein or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), and/or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), an eye tracking subsystem, and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer storage media, and device-storage media specifically and unequivocally excludes carrier waves, modulated data signals, communication mechanisms, and other such transitory media.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A computer implemented method providing controls for cryptographic material, comprising:
receiving, from a calling process, a set of context parameters;
identifying a cryptographic process based on a subset of the context parameters;
retrieve a cryptographic process definition for the identified cryptographic process from a process store, the cryptographic process definition comprising a plurality of cryptographic process operations and one or more controls attached to one or more of the cryptographic process operations;
instantiating the cryptographic process;
for each of the plurality of cryptographic process operations in the instantiated cryptographic process:
identify whether the cryptographic process operation has an attached control;
responsive to identifying that the cryptographic process operation does have an attached control:
execute the attached control; and
executing the cryptographic process operation.

Example 2. The method of claim 1 further comprising:
responsive to identifying that the cryptographic process operation does not have an attached control, executing the cryptographic process operation.

Example 3. The method of claim 1 or 2 wherein the attached control is executed prior to the cryptographic process operation and wherein the cryptographic process operation is executed responsive to successful completion of the attached control.

Example 4. The method of claim 1 or 2 wherein the attached control is executed subsequent to the cryptographic process operation and wherein the attached control is executed responsive to successful completion of the cryptographic process operation.

Example 5. The method of claim 1, 2, 3 or 4 further comprising creating an entry in an audit trail.

Example 6. The method of claim 1, 2, 3, 4, or 5 wherein the attached control comprises one or more of:
an authorization;
an authentication;
a number of times the cryptographic operation can be executed;
a time span when the cryptographic operation can be executed; and
a geographic region.

Example 7. The method of claim 1, 2, 3, 4, 5, or 6 wherein the set of context parameters is received via a cryptographic agent residing on a same machine as the calling process.

Example 8. The method of claim 1, 2, 3, 4, 5, 6, or 7 wherein the cryptographic process performs at least one of:
signing a hash or digest;
requesting a new cryptographic certificate;
requesting generation of a new cryptographic key pair; and
requesting renewal of a cryptographic certificate or cryptographic key pair.

Example 9. The method of claim 1, 2, 3, 4, 5, 6, 7, or 8 further comprising:
presenting a user interface having a representation of the plurality of cryptographic process operations and the one or more controls;
receiving an ordered sequence of the plurality of cryptographic process operations;
receiving an attachment of a subset of the one or more controls to at least one cryptographic process operation; and
creating the cryptographic process definition based on the received ordered sequence and received attachment.

Example 10. The method of claim 1, 2, 3, 4, 5, 6, 7, 8, or 9 wherein instantiating the cryptographic process comprises sending the process definition to an execution engine.

Example 11. The method of claim 1, 2, 3, 4, 5, 6, 7, 8, or 9 wherein instantiating the cryptographic process comprises instantiating a plurality of objects, each object corresponding to a cryptographic process operation or a control.

Example 12. The method of claim 1, 2, 3, 4, 5, 6, 7, 8, 9, 10, or 11 wherein the cryptographic process comprises a plurality of controls attached to one of the cryptographic process operations, and wherein the plurality of controls comprises an ordered sequence, an unordered sequence, or both.

Example 13. The method of claim 1, 2, 3, 4, 5, 6, 7, 8, 9, 10, 11, or 12 wherein the cryptographic process comprises a plurality of controls attached to one of the cryptographic process operations, and wherein the calling process comprises a code signing tool or a tool to obtain cryptographic material.

Example 14. An apparatus comprising means to perform a method as claimed in any preceding claim.

Example 15. Machine-readable storage including machine-readable instructions, when executed, to implement a method or realize an apparatus as claimed in any preceding claim.

Example 16. A computer implemented method providing controls for cryptographic material, comprising:
 receiving, from a calling process, a set of context parameters;
 identifying a cryptographic process based on a subset of the context parameters;
 retrieve a cryptographic process definition for the identified cryptographic process from a process store, the cryptographic process definition comprising a plurality of cryptographic process operations and one or more controls attached to one or more of the cryptographic process operations;
 instantiating the cryptographic process;
 for each of the plurality of cryptographic process operations in the instantiated cryptographic process:
 identify whether the cryptographic process operation has an attached control;
 responsive to identifying that the cryptographic process operation does have an attached control:
  execute the attached control; and
  executing the cryptographic process operation.

Example 17. The method of claim 16 further comprising:
 responsive to identifying that the cryptographic process operation does not have an attached control, executing the cryptographic process operation.

Example 18. The method of claim 16 wherein the attached control is executed prior to the cryptographic process operation and wherein the cryptographic process operation is executed responsive to successful completion of the attached control.

Example 19. The method of claim 16 wherein the attached control is executed subsequent to the cryptographic process operation and wherein the attached control is executed responsive to successful completion of the cryptographic process operation.

Example 20. The method of claim 16 further comprising creating an entry in an audit trail.

Example 21. The method of claim 16 wherein the attached control comprises one or more of:
 an authorization;
 an authentication;
 a number of times the cryptographic operation can be executed;
 a time span when the cryptographic operation can be executed; and
 a geographic region.

Example 22. The method of claim 16 wherein the set of context parameters is received via a cryptographic agent residing on the same machine as the calling process.

Example 23. The method of claim 16 wherein the cryptographic process performs at least one of:
 signing a hash or digest;
 requesting a new cryptographic certificate;
 requesting generation of a new cryptographic key pair; and
 requesting renewal of a cryptographic certificate or cryptographic key pair.

Example 24. The method of claim 16 further comprising:
 presenting a user interface having a representation of the plurality of cryptographic process operations and the one or more controls;
 receiving an ordered sequence of the plurality of cryptographic process operations;
 receiving an attachment of a subset of the one or more controls to at least one cryptographic process operation; and
 creating the cryptographic process definition based on the received ordered sequence and received attachment.

Example 25. The method of claim 16 wherein instantiating the cryptographic process comprises sending the process definition to an execution engine.

Example 26. A system comprising:
 a processor coupled to memory storing executable instructions, which when executed by the processor cause the processor to perform operations comprising:
 receiving, from a calling process, a set of context parameters;
 identifying a cryptographic process based on a subset of the context parameters;
 retrieve a cryptographic process definition for the identified cryptographic process from a process store, the cryptographic process definition comprising a plurality of cryptographic process operations and one or more controls attached to one or more of the cryptographic process operations;
 instantiating the cryptographic process;
 for each of the plurality of cryptographic process operations in the instantiated cryptographic process:
 identify whether the cryptographic process operation has an attached control;
 responsive to identifying that the cryptographic process operation does have an attached control:
  execute the attached control; and
  executing the cryptographic process operation.

Example 27. The system of claim 26 further comprising:
 responsive to identifying that the cryptographic process operation does not have an attached control, executing the cryptographic process operation.

Example 28. The system of claim 26 wherein the attached control comprises one or more of:
 an authorization;
 an authentication;
 a number of times the cryptographic operation can be executed;
 a time span when the cryptographic operation can be executed; and
 a geographic region.

Example 29. The system of claim 26 wherein the cryptographic process performs at least one of:
 signing a hash or digest;
 requesting a new cryptographic certificate;
 requesting generation of a new cryptographic key pair; and
 requesting renewal of a cryptographic certificate or cryptographic key pair.

Example 30. The system of claim 26 further comprising:
 presenting a user interface having a representation of the plurality of cryptographic process operations and the one or more controls;
 receiving an ordered sequence of the plurality of cryptographic process operations;
 receiving an attachment of a subset of the one or more controls to at least one cryptographic process operation; and creating the cryptographic process definition based on the received ordered sequence and received attachment.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method providing controls for cryptographic material, comprising:
   receiving, from a calling process, a set of context parameters;
   identifying a cryptographic process based on a subset of the context parameters;
   retrieving a cryptographic process definition for the identified cryptographic process from a process store, the cryptographic process definition comprising a plurality of cryptographic process operations and one or more controls attached to one or more of the cryptographic process operations, the one or more controls including an authentication check and a geographic check;
   instantiating the cryptographic process; and
   for each of the plurality of cryptographic process operations in the instantiated cryptographic process:
   identifying whether the cryptographic process operation has an attached control; and
      responsive to identifying that the cryptographic process operation does have an attached control:
         executing the attached control; and
         executing the cryptographic process operation.

2. The method of claim 1 further comprising:
   responsive to identifying that the cryptographic process operation does not have an attached control, executing the cryptographic process operation.

3. The method of claim 1 wherein the attached control is executed prior to the cryptographic process operation and wherein the cryptographic process operation is executed responsive to successful completion of the attached control.

4. The method of claim 1 wherein the attached control is executed subsequent to the cryptographic process operation and wherein the attached control is executed responsive to successful completion of the cryptographic process operation.

5. The method of claim 1 further comprising creating an entry in an audit trail.

6. The method of claim 1 wherein the attached control comprises one or more of:
   an authorization;
   an authentication;
   a number of times the cryptographic operation can be executed;
   a time span when the cryptographic operation can be executed; and
   a geographic region.

7. The method of claim 1 wherein the set of context parameters is received via a cryptographic agent residing on the same machine as the calling process.

8. The method of claim 1 wherein the cryptographic process performs at least one of:
   signing a hash or digest;
   requesting a new cryptographic certificate;
   requesting generation of a new cryptographic key pair; and
   requesting renewal of a cryptographic certificate or cryptographic key pair.

9. The method of claim 1 further comprising:
   presenting a user interface having a representation of the plurality of cryptographic process operations and the one or more controls;
   receiving an ordered sequence of the plurality of cryptographic process operations;
   receiving an attachment of a subset of the one or more controls to at least one cryptographic process operation; and
   creating the cryptographic process definition based on the received ordered sequence and received attachment.

10. The method of claim 1 wherein instantiating the cryptographic process comprises sending the cryptographic process definition to an execution engine.

11. A system comprising:
   a memory; and
   a processor coupled to the memory storing executable instructions, which when executed by the processor cause the processor to perform operations comprising:
      receiving, from a calling process, a set of context parameters;
      identifying a cryptographic process based on a subset of the context parameters;
      retrieving a cryptographic process definition for the identified cryptographic process from a process store, the cryptographic process definition comprising a plurality of cryptographic process operations and one or more controls attached to one or more of the cryptographic process operations, the one or more controls including an authentication check and a geographic check;
      instantiating the cryptographic process; and
      for each of the plurality of cryptographic process operations in the instantiated cryptographic process:
         identifying whether the cryptographic process operation has an attached control; and
         responsive to identifying that the cryptographic process operation does have an attached control:
            executing the attached control; and
            executing the cryptographic process operation.

12. The system of claim 11 further comprising:
   responsive to identifying that the cryptographic process operation does not have an attached control, executing the cryptographic process operation.

13. The system of claim 11 wherein the attached control is executed prior to the cryptographic process operation and wherein the cryptographic process operation is executed responsive to successful completion of the attached control.

14. The system of claim 11 wherein the attached control is executed subsequent to the cryptographic process operation and wherein the attached control is executed responsive to successful completion of the cryptographic process operation.

15. The system of claim 11 further comprising creating an entry in an audit trail.

16. The system of claim 11 wherein the attached control comprises one or more of:
   an authorization;
   an authentication;
   a number of times the cryptographic operation can be executed;
   a time span when the cryptographic operation can be executed; and
   a geographic region.

17. The system of claim 11 wherein the set of context parameters is received via a cryptographic agent residing on the same machine as the calling process.

18. The system of claim 11 wherein the cryptographic process performs at least one of:
    signing a hash or digest;
    requesting a new cryptographic certificate;
    requesting generation of a new cryptographic key pair; and
    requesting renewal of a cryptographic certificate or cryptographic key pair.

19. The system of claim 11 further comprising:
    presenting a user interface having a representation of the plurality of cryptographic process operations and the one or more controls;
    receiving an ordered sequence of the plurality of cryptographic process operations;
    receiving an attachment of a subset of the one or more controls to at least one cryptographic process operation; and
    creating the cryptographic process definition based on the received ordered sequence and received attachment.

20. A non-transitory computer storage medium comprising executable instructions that, when executed by a processor of a machine, cause the machine to perform acts comprising:
    receiving, from a calling process, a set of context parameters;
    identifying a cryptographic process based on a subset of the context parameters;
    retrieving a cryptographic process definition for the identified cryptographic process from a process store, the cryptographic process definition comprising a plurality of cryptographic process operations and one or more controls attached to one or more of the cryptographic process operations, the one or more controls including an authentication check and a geographic check;
    instantiating the cryptographic process; and
    for each of the plurality of cryptographic process operations in the instantiated cryptographic process:
        identifying whether the cryptographic process operation has an attached control; and
        responsive to identifying that the cryptographic process operation does have an attached control:
            executing the attached control; and
            executing the cryptographic process operation.

* * * * *